Patented Dec. 17, 1929

1,739,771

UNITED STATES PATENT OFFICE

JOHN H. SCHMIDT, OF BLOOMFIELD, NEW JERSEY, ASSIGNOR TO BAKELITE CORPORATION, OF NEW YORK, N. Y., A CORPORATION OF DELAWARE

POLYBASIC-ACID-POLYHYDRIC-ALCOHOL RESIN AND METHOD OF MAKING SAME

No Drawing. Application filed March 16, 1928. Serial No. 262,322.

This invention relates to compositions of a resinous nature obtained through the interaction of a polyhydric alcohol, such as glycerol, and a poly-basic acid or its anhydride such as phthalic anhydride. These compositions are sometimes known as glyptal resins and for convenience will be so designated herein.

That resinous bodies can be so obtained has long been known. The Journal of the Society of Chemical Industry (vol. 20, page 1075, issued Nov. 30, 1901) contains an article by Watson Smith that describes the reaction and concludes that the product is probably a diglyceryl triphthalate, since on heating with alkali hydrates, saponification takes place. As the article further points out, the reaction presents difficulties in operation due to the extraordinary tendency of the mass to froth and immediately solidify into a glass-like slag when apparently all excess of glycerin has come over, and this action occurs without regard to the proportion of phthalic anhydride employed in the mixture. The glass-like slag product so obtained has a fusion point that is so close to its decomposition point that the product begins to decompose and char before it can be melted.

It has been proposed by others to avoid the formation of the useless porous slag product by stopping the initial reaction when the mass has reached that stage where small samples upon cooling become hard and brittle without stickiness, and then allowing the mass to cool; after cooling the product is to be baked or "cured" by heating at relatively low temperatures of 85 to 135° C. It has also been proposed that the baked product be heated further at higher temperatures of 180 to 250° C. to distill off free glycerin present in the product to yield a tougher, harder product.

It has been my experience, however, that the proposed procedure is not applicable to the production of blocks or masses of any appreciable thickness, for a baking of blocks of about an inch in thickness that is prolonged over a very long period, a year or more, does not suffice to advance or harden the product so produced to a degree where it is commercially usable, and the use of baking temperatures in the neighborhood of 200° C. or more cause a porous formation that spoil the blocks for any intended use.

In accordance with the present invention, glyptal compositions in thicknesses of an inch or more, in a state of advancement or hardness, capable of mechanical working or machining, and possessing toughness, strength, etc. that are commercially demanded, can be obtained. It is based on the discovery that, in order to produce glyptal compositions with such properties, it is not sufficient to carry them merely to that point where a sample hardens upon cooling, for such a condition occurs relatively early in the reaction period; but rather that it is essential for the initial reaction to be carried forward to such a stage that, if the mass be allowed to cool, or even if the mass be poured in bulk into a cold vessel, it "kicks over" or is transformed to the frothy slag condition due to the contained heat provided a relatively short baking period, for example one of about twelve weeks, is to be had.

I have further discovered that the frothy formation can be avoided at this stage by providing for a sudden decided drop of temperature or chilling throughout the mass or bulk of the composition. This I find can be readily accomplished by pouring the fused product into enameled trays or paper boxes to form thin slabs, and these slabs are then exposed to normal room temperature until they solidify. By this treatment the heat is so rapidly dissipated from the composition that no opportunity is given it to "kick over"; and the dissipation of heat is assisted by the use of metal trays, which for this reason are preferred. When cool, the slabs can be broken up and other trays or boxes filled to the desired depth with the lumps or broken portions. Since the initial reaction product is fusible at temperatures below 125° C., the lumps or particles melt and run together when the filled trays are placed in ovens or kilns heated to such a temperature.

In order that the invention may be disclosed with completeness, a specific procedure is hereinafter set forth, though it is to be understood that the invention is not restricted to the detailed steps outlined, but is to be given a scope commensurate with the appended claims.

A batch is made up by charging a mixing kettle with glycerol and phthalic anhydride, the latter in excess and in proportions following the known practice (see p. 1—line 29, of patent to Callahan, No. 1,108,329, granted Aug. 25, 1914). It is desirable that the ingredients be of high purity and particularly that they be free from color, for it is found that any coloration is likely to persist in the final product. If any coloring matter in the nature of a dye is to be used, it is preferably added to the raw ingredients in the mixing kettle. Phthalic anhydride is very soluble in warm glycerol and after mixing the liquid batch is passed through a filter into the reaction kettle. The filtering operation assures a clear batch, which is essential for a clear, substantially colorless product and, being conducted after the mix, further serves to protect the operator from excessive phthalic fumes. The initial reaction is then carried out by applying heat to the reaction kettle.

As the ingredients react, water is formed and the reaction proceeds at a relatively low temperature until the water is largely eliminated. Some phthalic anhydride is also driven off as well as some glycerine.

With the elimination of the water the temperature can be allowed to rise until it approaches the boiling point of glycerol or from 200 to 210° C., and the heating continued until a sample preferably at a temperature between 180 and 190° C. has such consistency that it can be drawn into a string. During the heating period the mass is thoroughly agitated so that all parts will be heated as uniformly as possible. When the batch has reached the point indicated by the test, heating is discontinued and the batch is quickly poured in the form of thin layers or slabs of about half an inch or up to an inch in thickness into enameled trays or into paper boxes.

The heating at the end of the initial reaction stage can be carried to a point further than that indicated, and even up to 235° C. or the temperature at which the transformation into the porous slag takes place when no control of the heat supplied is exercised. But the rise in temperature becomes more rapid as the reaction nears completion, and the reaction becomes increasingly difficult to control as the temperatures are permitted to rise beyond 210° C.

In actual practice it has been found that the mentioned stringing test applied when the batch has been reacted at a temperature of about 205° or so indicates that the reaction has proceeded to an extent to give a product that can be hardened satisfactorily.

On the other hand, the heating can be so regulated that the temperature is maintained well below 200° C. or even as low as 150° C. and the reaction will still continue to the point where the mass "kicks over" into the slag condition. The time of the reaction, however, is then so prolonged that, whereas the reaction of a small laboratory batch is completed in about an hour or so under the specific procedure above recited, the reaction of the same sized batch may require a period of a couple of days when conducted at low temperatures. On a commercial scale the reaction period is increased in correspondence to the size of the batch, and the desirability of the use of high temperatures, provided other conditions can be met, is therefore apparent.

When the raw ingredients are selected for purity and absence of color as above specified and they are mixed and filtered before charging the reaction kettle (both of which conditions I regard as important in the production of a commercially satisfactory article), an initial reaction product is obtained by the above procedure that is substantially free from inherent color and otherwise commensurate in its properties with an initial reaction product obtainable by a prolonged heating at relatively low temperatures ranging from 150 to 175° C.

The boxes or trays containing the thin slabs are kept at a normal room temperature until the slabs solidify. The pouring of the kettle content into trays at room temperature and the pouring of the mass in the form of thin slabs insures a sudden chilling or a decided temperature drop through the mass in its entirety with the result that no perceptible "kicking-over" or formation of the porous slag occurs. As the slabs cool, the composition solidifies, but it is still fusible at temperatures below 125° C. and is soluble in acetone and other solvents.

The solidified slabs are broken up into lumps about one inch mesh and paper boxes are filled with weighed amounts to give castings of desired thickness. The boxes are then placed in kilns maintained at temperatures of from 125° to 135° C. and the lumps melt and run together; when the castings have set up the outer paper box coverings can be removed and the baking continued to gradually harden them. For castings or blocks of about one inch in thickness the setting up of the composition occurs in a few days and the baking or "curing" period is about twelve weeks at a temperature of about 125° C. Where the slabs formed by pouring from the kettle have the desired thickness and are otherwise satisfactory, it is not necessary to break them up and they can be placed in that form in the kiln for baking.

The baking period can be continued and the hardness thereby increased, or the temperature at which the baking or hardening takes place can be increased to 145° C. or to 175° or 180° C. to secure a corresponding hardening effect.

The blocks obtained at the end of the baking period are infusible, resistant to acetone and similar solvents and have a hardness, toughness and durability that permit them to be cut or otherwise machined for the manufacture of pencils, pipe stems, umbrella handles and similar articles.

Other polyhydric alcohols and other polybasic acids of either the aliphatic or aromatic series or mixtures thereof known to the art can be used in place of the raw ingredients specified. For example, succinic acid can be substituted in whole or in part for phthalic acid anhydride and the same procedure followed as to carrying forward the initial reaction and the other steps described, the principle variance being the temperatures at which the reaction proceeds, etc. and which temperatures are readily determined by preliminary tests.

I claim:

1. A process of obtaining a composition of the glyptal type which comprises dissolving phthalic anhydride in glycerol, filtering the mixture to remove impurities therefrom, heating the mixture to cause a reaction and continuing the heating until a temperature of about 205° C. is reached and a sample at a temperature of about 180 to 190° C. exhibits the property of stringing, then chilling the fused mass by pouring into thin slabs exposed to normal room temperatures until solidification occurs, and baking the cooled product at about 125 to 145° C. for a period of about twelve weeks, when the slabs have a thickness of about an inch, to advance or harden the composition.

2. A process of preparing a composition of the glyptal type which comprises reacting glycerol and phthalic anhydride, the latter in excess, by applying heat thereto substantially toward the point of slag formation, arresting the reaction by chilling the mass, and hardening the composition by further heating.

3. In a process of preparing a composition of the glyptal type from a polyhydric alcohol and a polybasic acid, the steps which comprise causing the mixture of raw ingredients to react substantially toward the point of slag formation and arresting the reaction by chilling the mass.

4. A composition of the glyptal type commensurate with that obtained by the process of claim 1.

5. The process of preparing a composition of the glyptal type from a poly-hydric alcohol and a poly-basic acid which comprises causing the mixture of ingredients to react materially beyond that stage at which a small sample upon cooling becomes hard and brittle, and arresting the reaction prior to a transformation of the mass to a slag condition.

6. A composition of the glyptal type such as is obtained by the process of claim 2.

7. A composition of the glyptal type such as is obtained by the process of claim 3.

8. A composition of the glyptal type such as is obtained by the process of claim 5.

In testimony whereof I affix my signature.

JOHN H. SCHMIDT.